United States Patent [19]

Ochoa et al.

[11] Patent Number: 4,566,998
[45] Date of Patent: Jan. 28, 1986

[54] PRODUCTION OF HYDROGEN PEROXIDE

[75] Inventors: Victor M. Ochoa; Ricardo Pueyo, both of La Zaida, Spain

[73] Assignee: Foret S.A., Barcelona, Spain

[21] Appl. No.: 306,101

[22] Filed: Sep. 28, 1981

[51] Int. Cl.$^4$ .............................................. C07C 50/18
[52] U.S. Cl. .................................................. 260/369
[58] Field of Search ......................................... 260/369

[56] References Cited

U.S. PATENT DOCUMENTS

| | | | |
|---|---|---|---|
| 2,158,525 | 5/1939 | Riedi et al. | 260/369 |
| 2,739,875 | 3/1958 | Sprauer et al. | 260/369 |
| 3,098,714 | 7/1963 | Käbisch et al. | 260/369 |
| 3,150,930 | 9/1964 | Hiratsaka et al. | 260/369 |
| 3,179,672 | 4/1965 | Herzog et al. | 260/369 |
| 3,307,909 | 3/1967 | Reilly | 260/369 |
| 3,432,267 | 3/1969 | Lee et al. | 260/369 |
| 3,767,778 | 10/1973 | Glasselmann et al. | 423/588 |
| 3,912,766 | 10/1975 | Logan et al. | 260/369 |
| 3,965,251 | 6/1976 | Shin et al. | 260/369 |

FOREIGN PATENT DOCUMENTS

| | | | |
|---|---|---|---|
| 1319025 | 1/1963 | France | 260/369 |
| 1121275 | 7/1965 | United Kingdom | 260/369 |
| 1405251 | 12/1971 | United Kingdom | 260/369 |

Primary Examiner—Glennon H. Hollrah
Assistant Examiner—Raymond Covington
Attorney, Agent, or Firm—R. E. Elden; F. Ianno

[57] ABSTRACT

A working solution for producing hydrogen peroxide (made up of an anthraquinone working compound dissolved in one or more solvents) is regenerated with an alkaline, activated alumina, containing about 3.7 wt. % $Na_2O$ at temperatures of about 145° C., wherein both the oxidized and hydrogenated work solution are mixed and treated with the said alumina simultaneously on a continuous basis, so that regeneration proceeds continually and degradation products are maintained within controllable limits.

10 Claims, No Drawings

PRODUCTION OF HYDROGEN PEROXIDE

The invention relates to the regeneration of working solution employed in the manufacture of hydrogen peroxide.

It is known that anthraquinone compounds, e.g. 2-ethylanthraquinone, and their tetrahydro derivatives can be used as working compounds in a process for producing hydrogen peroxide. In this process, commonly known as the anthraquinone process, the working compound is dissolved in a suitable solvent or solvent mixture and is alternately reduced and oxidized. During the reducing stage, the working compound is hydrogenated in the presence of a catalyst to reduce it to its hydroquinone form. In the subsequent oxidation step, the working compound is oxidized with air, oxygen or other oxygen-containing gas to convert it to its quinone form with concomitant formation of hydrogen peroxide. The hydrogen peroxide produced is then removed from the working solution preferably by extraction with water, and the remaining working solution is recycled to the hydrogenator to recommence the cyclic process for producing hydrogen peroxide. The detailed operation of this process is described fully in U.S. Pat. Nos. 2,158,525 and 2,215,883.

During cyclic hydrogenation and oxidation of the working solution in the above process, and particularly during the catalytic hydrogenation step, the anthraquinone working compound is gradually converted to degration products that are unable to produce hydrogen peroxide. The rate of formation of these degradation products increases as the temperature of the working solution being hydrogenated and oxidized is elevated. Additionally, as the proportion of the working compound which is hydrogenated per pass through the system (also termed "depth of hydrogenation") is increased, the amount of degradation products also rises sharply.

During the cyclic processing, these anthraquinone working compounds also undergo hydrogenation of other than the quinone group during the catalytic hydrogenation step. This results in the gradual formation of corresponding tetrahydroanthraquinone derivatives of the working compounds. These compounds, unlike the degradation products discussed above, will produce hydrogen peroxide upon cyclic reduction and oxidation in the same manner as the original anthraquinone working compound. Accordingly, the term "degradation products" as used herein does not apply to tetrahydro derivatives of the anthraquinone working compound.

In U.S. Pat. No. 2,739,875, issued to Jerome W. Sprauer on Mar. 27, 1956, there is described a process for treating an anthraquinone working solution containing degradation products whereby the solution can be regenerated to restore its hydrogen peroxide synthesizing capacity. In accordance with this process, the anthraquinone working solution is heated in the presence of either activated alumina or activated magnesia, thereby regenerating its hydrogen peroxide synthesizing capacity.

While this process has been found to be useful and effective in regenerating working solutions, after repeated cycling of the working solution through the activated alumina, the alumina quickly loses activity and fails to maintain the hydrogen peroxide productivity of the working solution.

It has now been found that an anthraquinone working solution which has been used to produce hydrogen peroxide can be subjected to an improved regeneration by passing a mixture of hydrogenated and oxidized work solution in contact with an alkaline activated alumina containing about 2.5 to 5 wt. % $Na_2O$ and preferably about 3.7 wt. % $Na_2O$ at temperatures of about 125° C. to about 160° C. and preferably 145° C. on a continuous basis, so that regeneration proceeds continually and degradation products are maintained within acceptable limits. This is best carried out by taking a bleed stream of from about 3.5 to 15%, and preferably 6 wt. % of the total solution circulating in the process for producing hydrogen peroxide, and treating this bleed stream with said alkaline activated alumina.

The activated alumina which is employed in the present invention is preferably produced by subjecting any commercial activated alumina to treatment with an aqueous solution of about 3 to 7 wt. % and preferably 5 wt. % of sodium hydroxide followed by drying at from 150° C. to 450° C. and preferably at 350° C. until the sodium oxide values have been fixed on the alumina.

The alumina which is treated in accordance with the present invention refers to any activated alumina obtained from natural or synthetic hydrated alumina whether or not it contains minor proportions of silica or other materials, and which is dehydrated by heating so as to convert the alumina to a less hydrated form, such as gamma-alumina monohydrate, without going to corundum, which is inactive. The alumina is then activated by heating it to temperatures in the range of 300° C. to 800° C. in order to convert it to a microporous alumina having an extensive surface area characteristic of activated alumina.

The present process employs such alumina, after an alkaline treatment discussed below, to treat anthraquinone working solutions which have been subjected to repeated cycles of catalytic hydrogenation and oxidation to produce hydrogen peroxide. The working solutions which come in contact with the alumina are those that contain an anthraquinone working compound such as 2-ethylanthraquinone or the 2-isopropyl, 2-sec-butyl-, 2,5-butyl-, 2-sec-amyl-, 2-methyl- or 1,3-dimethyl- derivatives of anthraquinone as well as other anthraquinones which are known in the hydrogen peroxide art. These working compounds are dissolved in at least one solvent to form the anthraquinone working solution; two or more mixed solvents may be used to enhance the solubility of the anthraquinone working compound in both its hydrogenated form, i.e. the hydroquinone form, and its oxidized form, i.e. the quinone form. Typical solvents employed in such work solutions are set forth in U.S. Pat. No. 3,767,778. These include the well-known mixtures of solvents as set forth in Table I. Mixtures of solvents, e.g. methylcyclohexylacetate and trioctyl phosphate as the hydroquinone solvent, and a benzene fraction as the quinone solvent, can also be employed for improved results.

The degradation products which are unable to produce hydrogen peroxide form in the anthraquinone working solution during the chemical reactions that take place in the catalytic hydrogenation step and in the oxidation of the working solution as it is circulated in a cyclic system to produce hydrogen peroxide. The alumina is used to adsorb undesired compounds and also to revert such degradation products to usable, active anthraquinone compounds which can produce hydrogen peroxide.

In general, the proportion of hydrogenated anthraquinone to oxidized anthraquinone is regulated so that said alumina regenerates that degradation product which has risen above the accepted value for the anthraquinone working solution. That is, the hydrogenated and oxidized working solutions each have different degradation products which can be regenerated by contact with said alumina under the conditions set forth in the present invention. Thus, if the degradation product which can be regenerated in the oxidized work solution becomes too high, the proportion of oxidized working solution which is being passed to the alumina is increased so that greater amounts of that degradation product can be regenerated. This keeps that degradation product within acceptable limits.

Conversely, if the degradation product is one which can be regenerated from the hydrogenated solution, the same procedure is employed in which a larger proportion of hydrogenated working solution is fed to the alumina treating zone for regeneration of that degradation product found in the hydrogenated solution.

The effectiveness of the regeneration treatment and of the alkaline activated alumina can be evaluated by analyzing the anthraquinone working solution for anthraquinone and tetrahydroanthraquinone, both of which produce hydrogen peroxide upon cyclic hydrogenation and oxidation. In addition, the anthraquinone working solution also may be analyzed for its epoxide value and for its anthrone value. The epoxide is a degradation product of the tetrahydroquinone derivative; that is, it has an oxygen atom attached to two vicinal carbon atoms of the tetrahydroanthraquinone. The anthrone is a degradation product of anthraquinone.

Since the epoxide and the anthrone compounds do not produce hydrogen peroxide upon cyclic reduction and oxidation in the anthraquinone working solution, they are maintained within specified, acceptable limits in the working solution and if they rise beyond these limits, the excessive amounts of these compounds are converted to usable anthraquinone compounds by the alumina treatment.

The following example is given to illustrate the invention, but is not deemed to be limiting thereof.

EXAMPLE

A working solution containing a mixture of solvents for both quinone and hydroquinone working compounds as set forth in Table I, and employing 2-ethylanthraquinone as the working compound was passed through an alumina column at a rate of 6.5 ml/min. The solution contained a mixture of 15 wt. % hydrogenated work solution and 85 wt. % oxidized work solution and was at a temperature of 145° C.±5° when in contact with the alumina column. The alumina column was 28 mm in diameter and 230 mm high and contained 40 grams of an alkaline activated alumina. The alumina was prepared by treating an activated gamma alumina with a 5% sodium hydroxide solution and subsequently heating the caustic-treated alumina to 350° C. for a few hours until the heated alumina exhibited no further weight loss. The alumina column was maintained in a thermostatically controlled solution at 145° C.±5°, and the working solution was passed through on a once-through basis without any recycling of the work solution. The working solution was analyzed before entering the alumina column. Samples of working solution after treatment in the column also were analyzed after the alumina had been in use for set periods of time. The working solution was analyzed for its 2-ethylanthraquinone (EQ) content, 2-ethyltetraanthraquinone (ETQ) content, and its 2-ethyltetraepoxideanthraquione (ETEQ) content and the percent change from its original content was calculated. These are reported in Table II. Also determined and reported are the reduction in acidity of the work solution after treatment in the alumina column.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure otherwise than as specifically described and exemplified herein.

TABLE I

MIXED SOLVENTS

| Quinone Solvent | Hydroquinone Solvent |
|---|---|
| 1. $C_8$-$C_{17}$ Ketones Xylene | $C_5$-$C_{12}$ Alcohols |
| 2. Anisole | Heptyl Alcohol |
| 3. Benzene | Methyl Cyclohexyl Acetate (SEXTATE) |
| 4. Alkyl Benzene | Methyl Cyclohexyl Acetate (SEXTATE) |
| 5. Benzene | Methyl Cyclohexyl Acetate (SEXTATE) |
| 6. Methyl Naphthalene | Diisobutyl Carbinol |
| 7. " | Phosphoric Acid Esters |
| 8. t-Butyl Toluene | Diisobutyl Carbinol |
| 9. Xylene | " |
| 10. Alkyl Benzene | Phosphoric Acid Esters e.g. trioctyl phosphate |
| 11. Benzene | Phosphoric Acid Esters e.g. trioctyl phosphate |

TABLE II

| Compound Analyzed For | Percent Increase* Or Decrease** From Starting Work Solution | | | | |
|---|---|---|---|---|---|
| | 1 Hr. | 2 Hr. | 4 Hr. | 6 Hr. | 10 Hr. |
| ETQ | +9.21 | +4.6 | +4.6 | +4.6 | +2.34 |
| EQ | +15.33 | +11.33 | +15.33 | +11.33 | +11.33 |
| ETEQ | −62.0 | −16.09 | −2.29 | −8.04 | −8.04 |
| | Percent Reduction In Acidity | | | | |
| Acidity | 100 (no acidity remaining) | 92 | 56 | 20 | 0 (Returned to original acidity) |

*Increase is designated by (+).
**Decrease = is designated by (−).

What is claimed is:

1. In a process of producing hydrogen peroxide by alternately hydrogenating and oxidizing an anthraquinone working solution, in which said working solution is regenerated by contacting the solution with an activated alumina, the improvement which comprises regenerating anthraquinone degradation products in said working solution by contacting a mixture containing both hydrogenated working solution and oxidized working solution with an alkaline activated alumina at a temperature of about 125° C. to 160° C., said alkaline activated alumina containing about 2.5 to 5% by wt. of $Na_2O$, and thereby regenerating anthraquinone-derived degradation products in said working solution.

2. Process of claim 1 wherein said alkaline activated alumina contains about 3.7% by wt. of $Na_2O$.

3. Process of claim 1 wherein said alkaline activated alumina is prepared by treating an active alumina with about 3 to about 7% by wt. sodium hydroxide solution and heating the caustic-treated alumina at about 350° C.

4. Process of claim 2 wherein said alkaline activated alumina is prepared by treating an active alumina with about 5% by weight sodium hydroxide solution and heating the caustic-treated alumina to about 350° C.

5. Process of claim 1 wherein said temperature is about 145° C.

6. Process of claim 1 wherein said mixture contains about 15% by wt. hydrogenated work solution and about 85% by wt. oxidized work solution.

7. Process of claim 1 wherein the solvent in said working solution is a mixture of methyl cyclohexyl acetate as the hydroquinone solvent, and a benzene fraction as the quinone solvent.

8. Process of claim 1 wherein the solvent in said working solution is a mixture of trioctyl phosphate as the hydroquinone solvent, and a benzene fraction as the quinone solvent.

9. Process of claim 1 wherein the hydroquinone solvent is a mixture of trioctyl phosphate and methyl cyclohexyl acetate.

10. Process of claim 9 wherein the quinone solvent is a benzene fraction.

* * * * *